Dec. 7, 1965

B. H. BOAN ETAL 3,222,547

SELF-BALANCING HIGH SPEED TRANSISTORIZED SWITCH DRIVER AND INVERTER

Filed Sept. 12, 1963

INVENTORS.
BYRON H. BOAN
ALFRED E. POPODI
BY
H. H. Losche
ATT'YS.

3,222,547
SELF-BALANCING HIGH SPEED TRANSISTORIZED SWITCH DRIVER AND INVERTER

Byron H. Boan, Richardson, Tex., and Alfred E. Popodi, Glen Burnie, Md., assignors, by mesne assignments, to the United States of America as represented by the Secretary of the Navy Filed Sept. 12, 1963, Ser. No. 308,602
9 Claims. (Cl. 307—88.5)

Figures 1, 2, 3, 4:
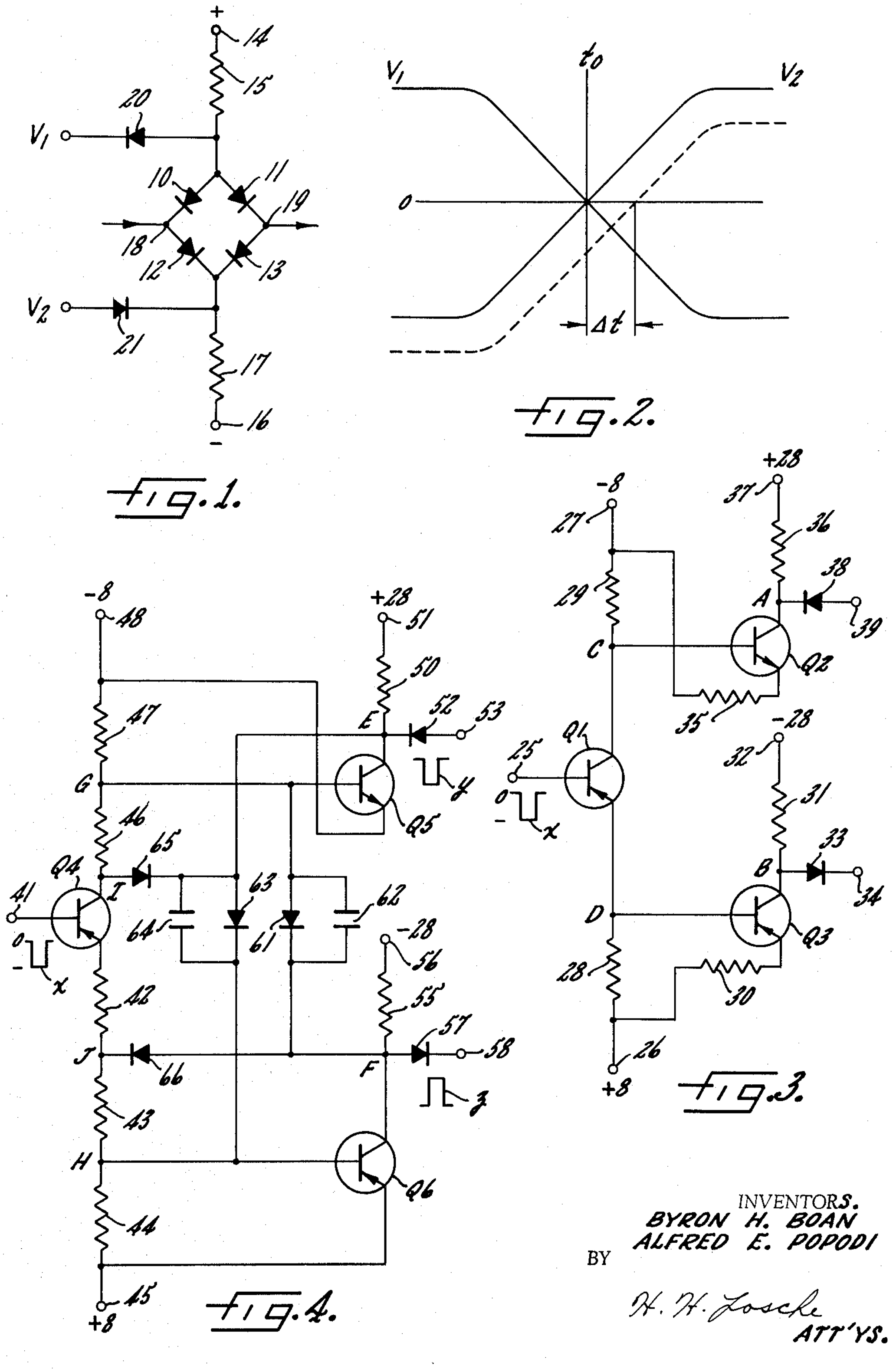

This invention relates to switch driver and inverter circuits and more particularly to a self-balancing, high speed transistorized regenerative switch driver and inverter circuit for producing inverted output signals simultaneously from a single ended input signal.

There is an ever-increasing need in electronic circuitry for increasing the speed of operation of switching circuits to meet the demands of high speed requirements of various equipment such as radar equipment, or the like, in the detection of high speed aircraft, missile, etc. Increasing the speed of electronic equipment often times increases the complications of the circuitry which produce disadvantages in the operation of the circuits. In one known switching circuit with a single ended input and a single ended output where switching is obtained by a diode bridge, two switching voltages are used to switch the diode bridge. If the two switching voltages are not maintained at precise levels, they would change the switching time from that needed or desired. Also, in a switch driver inverter circuit of known type where transistors are used as switching elements, the transistors are driven to saturation which saturation produces switching delays that destroy the ultimate purpose of a high speed switching device. Means are needed to acquire high switching speeds without the disadvantages of having to rely on two precise voltage levels or of encountering saturation of the switching elements.

In the present invention a transistor circuit, utilizing a single transistor as a driver and inverter to drive a pair of transistors with regenerative networks therein, is used to produce inverted outputs to insure high speed switching and high speed cutoff without over saturation of any of the transistor switching elements. The regenerative circuit includes a parallel network diode and capacitor means cross-coupling the collector outputs and base inputs of the two driven transistors to provide high speed switching. Additional diodes are coupled in the circuit in a manner to clamp base currents of the two driven transistors to avoid over saturation so that unwanted delays cannot be introduced into the switch driver and inverter circuit. It is therefore a general object of this invention to provide a self-balancing, high speed transistorized switch driver and inverter circuit with regenerative and clamping circuitry therein to insure very rapid switching and cutoff of input signals to produce inverted signals on two outputs thereof.

These and other objects and the attendant advantages, features, and uses will become more apparent to those skilled in the art as a more detailed description proceeds and considered along with the accompanying drawing, in which:

FIGURE 1 illustrates a widely used means of switching analog signals;

FIGURE 2 plots the switching voltages for the circuit of FIGURE 1;

FIGURE 3 is a transistorized switch driver and inverter circuit having a single ended input and two out-of-phase outputs; and FIGURE 4 is a novel and improved circuit illustration of a transistorized high speed switching circuit of this invention.

Referring more particularly to FIGURE 1 a most efficient and widely used means to switch analog signals of both polarities is a diode bridge as shown by the diodes 10, 11, 12, and 13 oriented to conduct positive voltage from a positive signal source 14 through a resistor 15 and the diode bridge to a negative direct current voltage source at 16 through a resistor 17. The bridge circuit 10 through 13 must have matched diodes and the resistors 15 and 17 must be equal for proper switching operation. Likewise, the positive voltage 14 must be equal and opposite in polarity to the negative voltage supplied at terminal 16. The left terminal 18 of the diode bridge has a signal input applied thereto and the terminal 19 is the signal output from the diode bridge. Two controlling switching voltages V1 and V2 are applied through diodes 20 and 21 to the upper and lower terminals of the diode bridge. The voltages V1 and V2 are of opposite polarity and vary between two fixed voltage levels symmetrical about zero direct current voltage, as shown in FIGURE 2 by the voltage waves V1 and V2. If V1 is positive and V2 negative, both diodes 20 and 21 are reversed biased and the bridge current forward biases the bridge diodes thus allowing any signal to pass from the input 18 to the output 19. If the voltage V1 switches to negative potential and V2 to a positive potential as shown in FIGURE 2, the four bridge diodes 10 through 13 are reversed biased and the switch is open. One of the prime requirements of this switch is to obtain maximum isolation between the switching gates and the analog signals. There should be no voltage transient at the signal terminals during the changeover from the "on" to the "off" state, and vice versa. This is particularly important when the requirements demand a wide dynamic range where large switching voltages are interrupting low level signals.

Assuming perfect symmetry of the circuitry of FIGURE 1 with respect to the input 18 and output 19 which guarantees zero quiescent output of the bridge, it is also most important to provide identical waveforms for the voltages V1 and V2 including inductive quiescent switching levels. From FIGURE 2 it can be seen that it is mandatory for transient free operation to have both switching voltages to intersect the zero voltage line with the same slope at the time $t_0$ and be much faster, that is about ten times faster, than the signal bandwidth being switched. Even if both waveforms were identical, one voltage starting at a different level as shown by the dotted voltage line of FIGURE 2, there would be a transient voltage lasting $\Delta t$ seconds at the signal terminals even when switching at zero direct current voltage.

As shown in FIGURE 3, in order to generate required out-of-phase voltages, the transistorized circuit may be used as shown. In FIGURE 3 driver inverter transistor Q1 has its base coupled to a signal input terminal 25 and its emitter and collector coupled between positive and negative voltage supply terminals 26 and 27 through resistors 28 and 29, respectively. Second and third transistors Q2 and Q3 have their emitters and bases coupled across the resistors 28 and 29, as shown. Transistor Q3 has its emitter coupled to the positive direct current voltage source 26 through an emitter resistor 30 and its base coupled to the emitter of transistor Q1 at terminal D. This places the emitter and base in parallel with the resistor 28. The collector terminal B of transistor Q3 is coupled through a collector load resistor 31 to a negative terminal direct current voltage source at 32. Terminal B is likewise coupled through a diode 33 to an output terminal 34. The emitter of transistor Q2 is coupled through an emitter load resistor 35 to the negative direct current voltage source 27 and the base of this transistor is coupled directly to the collector of transistor Q1 at terminal C. This places the emitter and base of transistor Q2 in parallel across the resistor 29. The emitter terminal A of transistor Q2 is coupled through a collector load resistor 36 to a positive direct current voltage source 37. Terminal A is likewise coupled through a diode 38 to an output terminal 39.

The circuit of FIGURE 3 provides push-pull outputs from a single ended input at 25. The input emitter follower transistor Q1 serves as both a phase inverter and a driver for the output transistors Q2 and Q3. The transistor Q2 is a N-P-N type while transistors Q3 is of P-N-P type and are turned "on" and "off" simultaneously thus rendering symmetrical inverted waveforms. Transistor Q1, like transistor Q3, is of P-N-P type. An input wave, such as X shown in FIGURE 3, applied to the terminal 25, will drive both transistors Q1 and Q2 to reproduce this waveform on the output terminal 39 and will drive transistor Q3 to produce an inverted waveform on the output terminal 34. From FIGURE 3 it can be seen that the voltage drop across resistors 28 and 29 provide the "on" and "off" bias voltages for transistors Q2 and Q3. The voltages on terminals 26, 27, 32, and 37 provide a working example for this circuit although other voltages may be used for changes in voltage bias or transistors. In the low collector current state of transistor Q1 there is always a certain amount of "turn on" bias depending on transistor gain, transistor tolerance, and input level. To achieve cutoff as close as possible it is necessary to insert emitter resistors 30 and 35 which in turn require higher input drive or gain for transistor Q1. Variations in transistor parameters of all three transistors effect the "turn off" levels at points A and B. In the interest of fast switching however, it is desirable to use small values for resistors 30 and 35.

In the "on" condition of Q1 in FIGURE 3, where the input switching voltage is negative, transistors Q2 and Q3 are turned "on" until the collectors thereof reach saturation level. Since saturation causes additional delays due to transistor hole storage it should be avoided. This is quite a disadvantage in use and operation of the circuit shown in FIGURE 3 where precise timing and extra high speed cutoff is required for high speed operating circuitry such as radar or the like.

Referring more particularly to FIGURE 4 there is illustrated a transistorized circuit of this invention conceived and designed to overcome the objections and disadvantages of the switching circuits shown and described for FIGURES 1 and 3. In this figure, a transistor Q4 has an input coupled to the base thereof from an input terminal 41 and its emitter and collector terminals coupled in a voltage divider circuit. The emitter of Q4 is coupled through resistors 42, 43, and 44 in series to a positive direct current voltage source terminal at 45. The junction of resistors 42 and 43 establish a terminal J and the junction of resistors 43 and 44 establish a terminal H. The collector of transistor Q4 is coupled through resistors 46 and 47 in series to a negative direct current voltage source at terminal 48. The collector terminal of transistor Q4 establishes a terminal point I and the junction of resistors 46 and 47 establish a terminal point G. A transistor Q5 has its base coupled to terminal point G and its emitter coupled to the direct current voltage source terminal 48 placing the base and emitter thereof across the resistor 47. The collector terminal E of transistor Q5 is coupled through a collector load resistor 50 to a positive direct current voltage source at terminal 51. The terminal E is also coupled to the cathode of a diode 52 the anode of which is coupled to an output terminal 53. In a symmetrical manner a transistor Q6 has its base and emitter coupled across the resistor 44, the base terminal being coupled to terminal H. The collector terminal F of transistor Q6 is coupled through a collector load resistor 55 to a negative voltage source at terminal 56. Terminal F is coupled to the anode of a diode 57 the cathode of which is coupled to an output terminal 58.

The regenerative circuitry for producing rapid switching and cutoff of the transistors Q5 and Q6 is established by cross-coupling the output terminals and base terminals of transistors Q5 and Q6. The base of transistor Q5 is coupled through a parallel network consisting of a diode 61 and a capacitor 62 to the collector output terminal F of transistor Q6. The diode is oriented with the anode thereof coupled to the base of transistor Q5 and the cathode thereof coupled to terminal F. The base of transistor Q6 is coupled through a parallel network consisting of a diode 63 and a capacitor 64 to the collector terminal E of transistor Q5. The diode 63 is oriented with its anode coupled to terminal E and its cathode coupled to the base of transistor Q6. This regenerative circuit also provides for balancing the voltages between the transistors Q5 and Q6 so that their operation will be identical though opposite in polarity.

Saturation of transistors Q5 and Q6 is prevented by diode networks coupled thereto to clamp the collector-base currents of each transistor. A diode 65 has its anode coupled to the terminal I and its cathode coupled to the terminal E. A diode 66 has its cathode coupled to terminal J and its anode coupled to terminal F. The diode 65 prevents excessive base currents in transistor Q5 while the diode 66 prevents excessive base currents in transistor Q6.

While terminals 45, 48, 51, and 56 show voltages for the purpose of providing an operative example, these voltages may be changed to meet the requirements of biasing voltage changes and are not in any way limiting of the invention.

*Operation*

Referring particularly to FIGURE 4 let it be assumed that the transistor Q4 is in the low current state or zero input voltage, then transistor Q5 will have only a slight "on" bias caused by the small voltage drop across resistor 47. The collector potential at terminal E of transistor Q5 tends to rise toward the supply voltage at terminal 51. Diode 63 connected between points E and H is nonconducting until the potential at point E become approximately equal to the potential at point H. At this moment current starts to flow in diode 63 rendering point H, which is the base of transistor Q6, more positive and thus rendering transistor Q6 less conductive, supporting the initial "turn off" drive. This in turn causes point F to become more negative which cuts off transistor Q5 more by virtue of diode 61. This is a regenerative effect which causes a well balanced fast and efficient cutoff for both transistors Q5 and Q6 independent of the input waveform as shown by X at terminal 41. The capacitors 62 and 64 enhance the switching speeds.

In the "on" state of transistor Q4 in which the negative switching pulse X is applied, its large collector current causes transistors Q5 and Q6 to conduct. The collector voltage of transistor Q5 at terminal E changes in a negative direction toward saturation level but does not reach it because diode 65 will start to conduct making terminal I, and accordingly, the base of transistor Q5, more negative. This prevents excessive base currents in the transistor Q5 and establishes effective clamping action at point E. Since the circuit is symmetrical, the same clamping action will be provided for the collector terminal output F of transistor Q6 by the diode 66. Accordingly, any negative switching voltage as shown by X on the input terminal 41 will produce the waveform Y at terminal 53 and the inverted waveform Z at terminal 58. Due to the additional positive feedback loop during the turn "off" state and due to the clamping action during turn "on," the quiescent and switching levels are primarily determined by the resistors 43, 44, 46, and 47 thus independent of the transistor tolerance and their temperature effects. Considerably higher switching speeds can be obtained because resistors 44 and 47 can be smaller. Also, emitter resistors for transistors Q5 and Q6 are not required as shown by resistors 30 and 35 in FIGURE 3 since the circuit provides its own additional cutoff bias. Variations of the collector current of transistor Q4 do not change the cutoff level of transistors Q5 and Q6 but may vary the clamping level in the "turn on" state. Since both outputs E and F are changing equal amounts, there is no increase in switching transients, assuming that the signal level is smaller than the switching voltage which is usually always the case. For the same reason the circuit is insensitive to variations in input level both in the "on" and "off" state and transistor saturation is avoided thus providing rapid switching speeds.

While many modifications and changes may be made in the constructional details and placement or kinds of parts or of voltage values in accordance with the teaching of this invention to accomplish the results and functions of this invention, we desire to be limited in the spirit and scope of our invention only by the scope of the appended claims.

We claim:

1. A self-balancing, high speed, electronic switch driver and inverter circuit comprising:
- first, second, and third electron emission devices, each having two conduction electrodes and a control electrode;
- biasing circuit means coupled to the conduction electrodes of said first electron emission device and to the conduction and control electrodes of said second and third electron emission devices;
- an input coupled to the control electrode of said first electron emission device and an output coupled to one of said conduction electrodes of each said second and third electron emission devices;
- means coupling the output of said second electron emission device with the control electrode of said third electron emission device through a unidirectional means;
- means coupling the output of said third electron emission device with the control electrode of said second electron emission device; and
- unidirectional means coupling one each conduction electrode of said first electron emission device respectively with each said output whereby signals applied to said input will be reproduced on one of said outputs and inverted on the other of said outputs simultaneously and substantially instantaneously from said input signals.

2. A self-balancing, high speed electronic switch driver and inverter circuit comprising:
- first, second, and third electron emission devices, each having emission, conduction, and control electrodes;
- biasing circuit means coupled to the emission and conduction electrodes of all said electron emission devices and to the control electrodes of said second and third electron emission devices;
- an input coupled to the control electrode of said first electron emission device, and first and second outputs coupled to the conduction electrode of each of said second and third electron emission devices, respectively;
- first unidirectional means coupling said first output with the control electrode of said third electron emission device, and second unidirectional means coupling the second output with the control electrode of said second electron emission device, said first and second unidirectional means having capacitive means in parallel therewith; and
- third unidirectional means coupling said conduction electrode of said first electron emission device with said first output, and a fourth unidirectional coupling means coupling said emission electrode of said first electron emission device with said second output whereby signals applied to said input will be reproduced on said first output and inverted on said output simultaneously from said input signals, said first and second unidirectional means and parallel capacitive means providing a regenerative effect for fast switching independent of the input signal and said third and fourth unidirectional means providing clamping effects for output signals.

3. A self-balancing, high speed, electronic switch driver and inverter circuit as set forth in claim 2 wherein
- said first and second unidirectional means are diodes, each having an anode and a cathode, said first diode having its anode coupled to said first output and said second diode having its cathode coupled to said second output to apply the positive voltage of said first output to the control electrode of said third electron emission device and to apply the negative voltage of the second output to the control electrode of said second electron emission device.

4. A self-balancing, high speed, electronic switch driver and inverter circuit as set forth in claim 3 wherein
- said third and fourth unidirectional means are diodes, each having an anode and a cathode, said third diode having its anode coupled to the conduction electrode of said first electron emission device and said second diode having its cathode coupled to said emission electrode of said first electron emission device through a resistance.

5. A self-balancing, high speed, electronic switch driver and inverter circuit as set forth in claim 4 wherein
- said electron emission devices are transistors in which said emission, conduction, said control electrodes are emitter, collector, and base electrodes, respectively.

6. A self-balancing, high speed, transistorized switch driver and inverter circuit comprising:
- first, second, and third transistors, each having emitter, collector, and base electrodes;
- a voltage biasing circuit coupled to bias the emitter and collector electrodes of all said transistors and to bias the base electrodes of said second and third transistors;
- an input coupled to the base electrode of said first transistor, a first output coupled to the collector of said second transistor, and a second output coupled to the collector of said third transistor;
- a first diode having an anode coupled to said first output and having a cathode coupled to the base electrode of said third transistor, said first diode, being paralleled by a capacitor to produce regenerative effects on said third transistor from said first output;
- a second diode having an anode coupled to the base electrode of said second tranistor and having a cathode coupled to said second output, said second diode being paralleled by a capacitor to produce regenerative effects on said second transistor from said second output;
- a third diode having an anode coupled to the collector electrode of said first transistor and having a cathode coupled to said first output to clamp negative going output voltage at the voltage of said first transistor collector voltage thereby preventing excessive base electrode currents of said second transistor; and
- a fourth diode having an anode coupled to said second output and having a cathode coupled to the emitter electrode of said first transistor through a biasing resistor to clamp positive going output voltage at the voltage established by the emitter biasing resistance of said first transistor thereby preventing excessive base electrode currents of said third transistor whereby input signals are switched to be reproduced on said first output and inverted on said second output in balanced and high speed response to said input signal.

7. A self-balancing, high speed, transistorized switch driver and inverter circuit as set forth in claim 6 wherein
- said voltage biasing circuit coupled to said first transistor consists of a voltage divider of three resistors coupled to the emitter thereof and a voltage divider of two resistors coupled to the collector thereof, and wherein said emitter and base electrodes of said second transistor being coupled across the resistor most removed from the collector of said first transistor and the emitter and base of said third transistor being coupled across the resistor most removed from the emitter of said first transistor to provide said biasing voltages therefor.

8. A self-balancing, high speed, transistorized switch driver and converter circuit as set forth in claim 7 wherein said first and third transistors are of the P-N-P type and said second transistor is of the N-P-N type.

9. A self-balancing, high speed, transistorized switch driver and converter circuit as set forth in claim 8 wherein said first output includes a diode in series having the cathode thereof coupled to the collector of said second transistor, and wherein said second output includes a diode in series having the anode thereof coupled to the collector of said third transistor.

References Cited by the Examiner

UNITED STATES PATENTS

| | | | |
|---|---|---|---|
| 3,031,588 | 4/1962 | Hilsendrath | 307—88.5 |
| 3,042,810 | 7/1962 | Rochelle | 307—88.5 |
| 3,170,075 | 2/1965 | Mellot | 307—88.5 |
| 3,188,491 | 6/1965 | Bahn | 307—88.5 |
| 3,192,401 | 6/1965 | Gray | 307—88.5 |

ARTHUR GAUSS, *Primary Examiner.*